Feb. 23, 1954  LA VERNE O. ELLINGSON  2,670,113
AUTOMOBILE BOAT LOADING AND CARRYING ATTACHMENT
Filed May 26, 1948  3 Sheets-Sheet 1
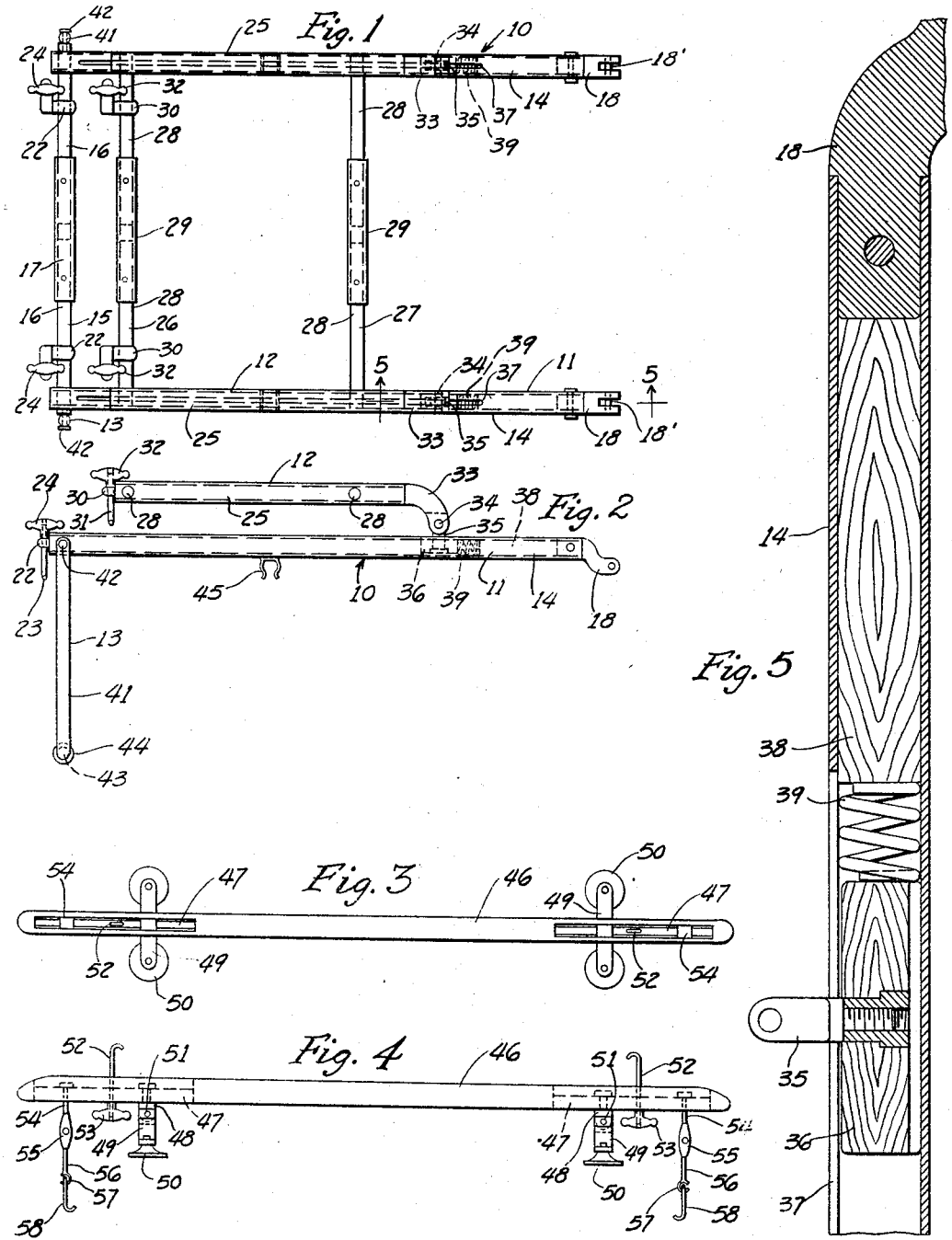
INVENTOR.
LaVerne O. Ellingson
Atty.

Feb. 23, 1954   LA VERNE O. ELLINGSON   2,670,113
AUTOMOBILE BOAT LOADING AND CARRYING ATTACHMENT
Filed May 26, 1948                      3 Sheets-Sheet 2
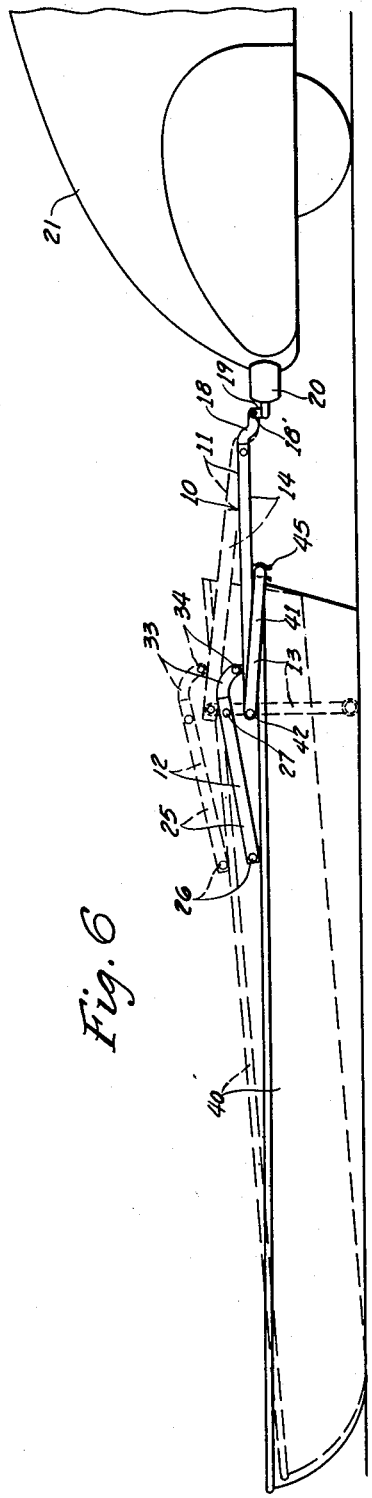
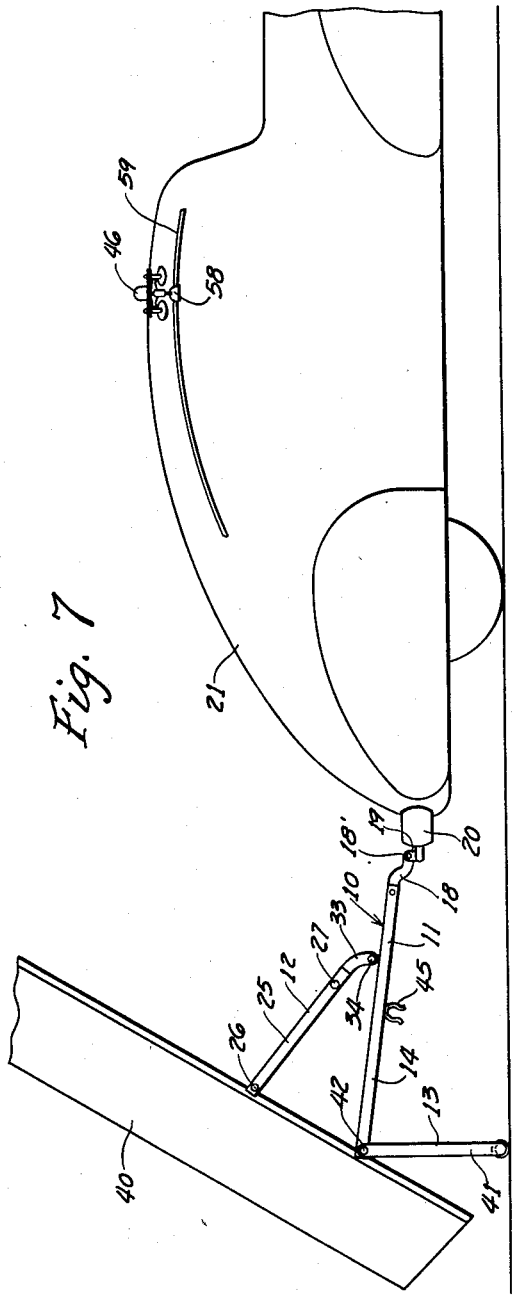
INVENTOR.
La Verne O. Ellingson
Atty.

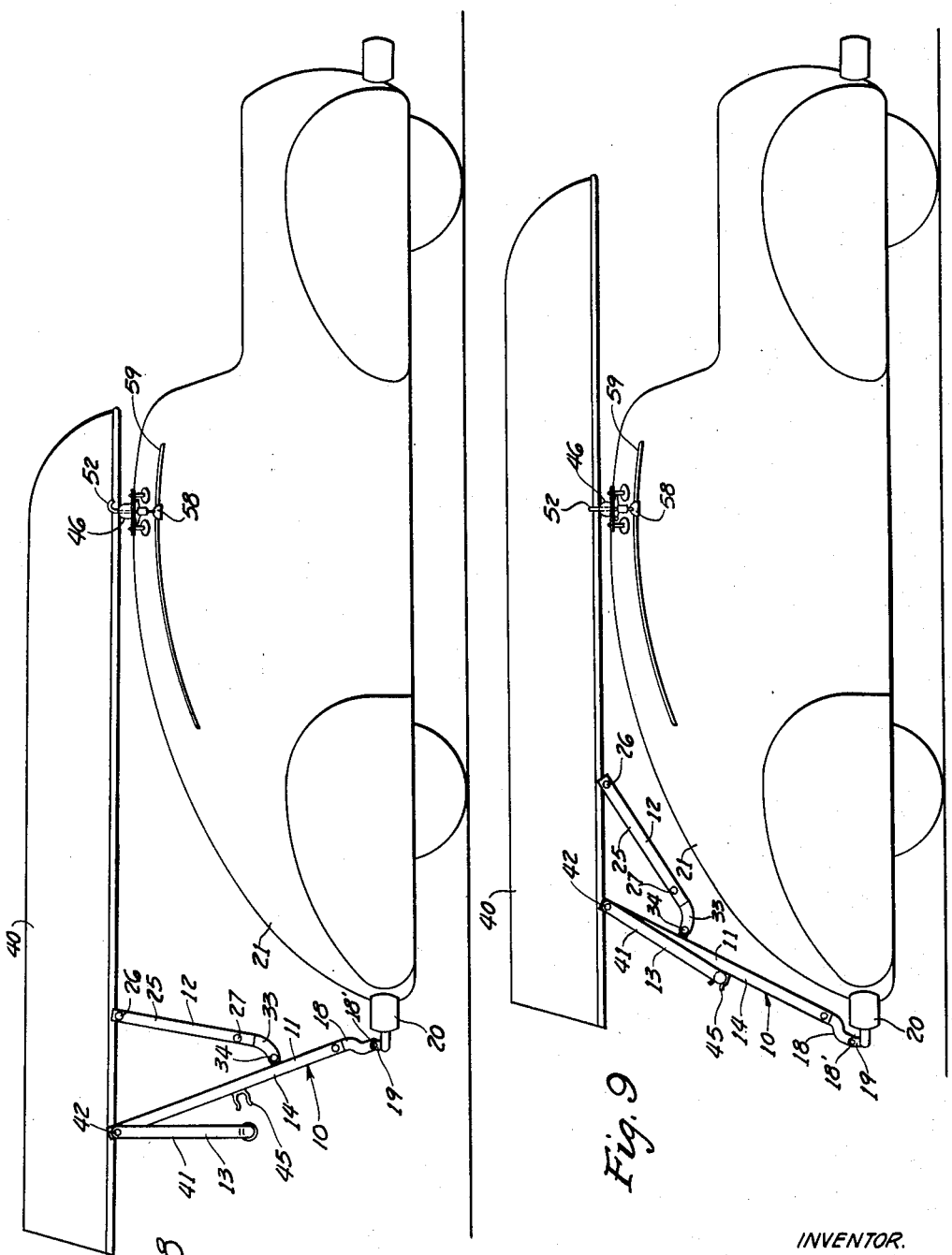

Patented Feb. 23, 1954

2,670,113

UNITED STATES PATENT OFFICE 2,670,113

AUTOMOBILE BOAT LOADING AND CARRYING ATTACHMENT

La Verne O. Ellingson, Monrovia, Calif.

Application May 26, 1948, Serial No. 29,277

11 Claims. (Cl. 224—42.03)

This invention relates to a new and improved automobile boat loading and carrying attachment.

The principal object of my invention is to provide an attachment of the kind mentioned, working on the principle of an overhead garage door, whereby to enable a single operator unaided to load a boat onto the top of an automobile quickly and easily, and with equal facility to unload the same, and without the slightest danger of damage to the boat or to the car, in either operation.

One of the salient features of the present attachment is the provision of an elongated main frame adapted to be hingedly attached at one end to the rear bumper of an automobile, and having pivotally and slidably connected thereto a secondary frame that is adapted to be detachably secured to one end portion of the boat, the main frame having also pivotally connected to the outer end thereof a prop frame that is adapted to be swung downwardly to a vertical position to prop up the rear end of the main frame after one end portion of the boat has been fastened to the attachment, so that the boat can be swung upwardly around the outer end of the main frame as an axis to an upright forwardly inclined loading position, after which the boat can be raised with the main frame and swung forwardly, about the hinging axis of the main frame as a center, over the top of the car in much the same way as one raises an overhead garage door to the overhead position.

Another important feature of the invention is the provision of boat attaching means pivoted on the outer end of the main frame to positively determine the pivotal axis for the boat in the first operation, when the boat is raised off the ground to the upright forwardly inclined loading position, during which operation the secondary frame slides on the main frame to a forward limit position in angular relation to the main frame, shock absorbing springs being preferably provided in the main frame to cushion the abutment of the secondary frame at the forward limit of its movement and accordingly eliminate shock and noise in the operation of the attachment.

Another feature of the invention is the provision of clips on the main frame for detachably securing the prop frame in folded relationship to the main frame when the boat is in transit, whereby to eliminate any likelihood of rattling.

Still another feature is the provision of a carrier bar extending transversely on top of the car body, near the front end, and suitably secured thereto, and carrying suitable means for detachably securing the forward end portion of the boat thereto when the boat has been slid forward to carrying position, thereby making the boat and its attachment an integral part of the car for transit and eliminating any likelihood of the boat coming loose under wind pressure or shifting rearwardly from a set position.

The invention is illustrated in the accompanying drawings, in which—

Figs. 1 and 2 are a top view and side view, respectively, of a boat loading and carrying attachment made in accordance with my invention;

Figs. 3 and 4 are a top view and rear view, respectively, of a carrier bar adapted to be secured to the top of the car for support and fastening of the front end portion of the boat in carrying position;

Fig. 5 is an enlarged sectional detail on the line 5—5 of Fig. 1, showing one of the two shock absorbing springs provided in the two side members of the main frame;

Fig. 6 is a side view of the attachment in use, attached to the rear bumper of a car, and showing the parts in full lines in the starting position, when the main frame and secondary frame are first attached to the gunwales of the boat, preferably near the stern end, and the parts being also shown in dotted lines in the positions assumed when the prop frame has been swung downwardly to operative position to prop up the rear end of the main frame, so as to enable swinging the boat upwardly to loading position without danger of scuffing it;

Fig. 7 shows the attachment with the boat in loading position, the top carrier bar, of Figs. 3 and 4, also appearing in this view in end elevation;

Fig. 8 is a view showing the boat swung forwardly from the position of Fig. 7 to a position resting on the carrier bar, and Fig. 9 shows the boat moved forward and fastened to the carrier bar in carrying position.

The same reference numerals are applied to corresponding parts throughout the views.

Referring first to Figs. 1, 2, and 5, the reference numeral 10 designates the attachment generally, and it comprises an elongated main frame 11, a secondary frame 12, and a prop frame 13. All of these elements are preferably of tubular construction for lightness, square aluminum tubing being used as far as practicable because of its rust resisting properties and the ease with which it can be fabricated. The main frame comprises two side members 14, which are disposed in spaced substantially parallel relation and are rigidly interconnected at one end, as at 15, the cross-member 15 consisting preferably of two coaxially arranged rods 16 adjustably telescopically connected by a tubular middle piece 17, to fit any size boat. Clevises 18 are provided on the side members 14 at the opposite end of the main frame for hinge connections, as indicated at 18', with brackets 19 suitably secured to the rear bumper 20 on the automobile 21 in connection with which the attachment is used. See Figs. 6 to 9. Brackets 22 pivotally mounted on the rods 16 have hooks 23 mounted therein, arranged to be applied to the gunwales of the boat and tightened by means of hand nuts 24 to attach the outer end of the main frame 11 securely to the boat and yet permit pivotal movement of the boat about the cross-member 15 as an axis.

The secondary frame 12 comprises two side members 25, which are rigidly connected, as at 26 and 27, each of these cross-members consisting of coaxially disposed rods 28 adjustably telescopically connected by a tubular member 29, to fit any size boat. Brackets 30, similar to the brackets 22, are pivotally mounted on the rods 28 of cross-member 26 and have hooks 31 mounted therein and arranged to be applied to the gunwales of a boat, similarly as the hooks 23, and tightened by means of hand nuts 32, so as to securely connect the outer end of the secondary frame 12 to the boat, while permitting pivotal movement of the secondary frame 12 with respect to the boat, as will soon appear. Curved clevis members 33 are mounted on the inner end of the secondary frame 12 and are pivotally connected, as at 34, with brackets 35 secured to hard wood slide blocks 36, which are freely slidable in the side members 14 of the main frame 11, these members being slotted longitudinally, as indicated at 37, for extension of the brackets 35 from the slide blocks and connection with the clevises 33, the slots 37 reach the major portion of the length of the side members 14, so that the inner end of the secondary frame 12 is free to slide from the outer end of the main frame 11 (see Fig. 6) nearly to the inner end of said main frame (see Fig. 7). A hard wood stop block 38 is provided in the inner end of each of the side members 14, and a coiled compression spring 39 is also provided in each of the side members 14 adapted to be compressed between the blocks 36 and 38 when the secondary frame 12 reaches the limit position shown in Fig. 7, namely, when the boat 40 is swung past an upper dead-center position to the forwardly inclined position, ready for loading on top of the car. The springs 39, in other words, absorb the shock and jar and eliminate noise in this important phase of the operation of loading a boat onto the top of a car.

The prop frame 13 comprises two L-shaped side members 41, the upper ends of which are pivotally connected, as at 42, with the outer ends of the rods 16, and the horizontal coaxially aligned lower ends 43 of which are telescopically adjustably connected by a tubular member 44, similarly as in the cross-members 15, 26, and 27, to suit any width of boat. Spring clips 45 are provided on the side members 14 of the main frame 11 for detachably securing the prop frame 13 in folded position, these clips 45 receiving the inturned end portions 43 of the side members 41 of said prop frame and serving to secure the prop frame to the main frame 11 in such a way as to eliminate likelihood of rattling.

A wooden cross-bar 46 is provided on top of the car, approximately over the driver's seat, to provide an elevated support for the front end portion of the boat 40 and a place to fasten the boat rigidly and securely in its finally loaded position for carrying. See Fig. 9. Longitudinally extending slots 47 are provided in the opposite ends of the bar 46, and brackets 48 are slidably adjustably mounted in these slots to permit adjusting brackets 49 that carry the suction cups 50 for detachably securing the bar 46 to the top of the car, such adjustment being necessary because of the difference in transverse curvature of the tops of different makes of cars, and it being, of course, important that the cross-bar 46 be supported out of contact with the top of the car, if at all possible. The brackets 49 are pivoted to the brackets 48, as at 51, so as to adapt the device to the curvature of the car top. Hooks 52 for connection to the gunwales of the boat 40 are slidably adjustable in the slots 47 and have hand nuts 53 threaded on the shanks thereof, arranged to be tightened so as to clamp the boat to the cross-bar 46, in the manner indicated in Fig. 9. Bolts 54 slidably adjustable in the slots 47 are adjustably threadedly connected by turnbuckles 55 with screw eyes 56, which, in turn, are pivotally connected, as at 57, with hook-shaped attaching plates 58 adapted to be hooked under the projecting gutter strips 59 on opposite sides of the car top, to anchor the opposite ends of the cross-bar 46 to the top.

In operation, the attachment of my invention functions like a foldable and unfoldable bracket, speaking with reference to the main frame 11 and secondary frame 12, to which members the boat is directly attached. See Figs. 6 and 7, in which the change in position of the secondary frame 12 in relation to the main frame 11 in the unfolding of the bracket is clearly illustrated, the side members of the secondary frame 12 serving as radius arms and, by virtue of their slidable pivotal connections with the side members of the main frame 11, automatically adjusting themselves as to angularity with respect to the main frame as the boat pivots with respect to the main frame. Obviously, in lieu of the combination sliding and pivotal connections with the main frame 11, the secondary frame 12 could be of telescopic construction and have only pivotal connections with the main frame, so as to elongate or shorten its length to accommodate the pivotal movement of the boat with respect to the main frame. However, the sliding connections with the main frame afford the advantage of greater simplicity and economy of construction, in that fewer parts are used, and the further advantage that it enables incorporating the shock absorbing springs 39 in the main frame, which play such an important part in the operation of this attachment. Referring to Fig. 6, when the boat 40 is to be loaded onto the top of the car 21, it is first placed, preferably stern end forward behind the car, and the hooks 23 are applied to the gunwales and tightened by means of hand nuts 24, so as to pivotally connect the stern end of the boat to the outer end of the main frame 11. The secondary frame 12 is then slid to its rearward limit position, and the hooks 31 are likewise attached to the gunwales of the boat and fastened by tightening the nuts 32 to pivotally connect the boat to the secondary frame 12. The prop frame 13 is then disconnected from the clips 45, so as to be free to swing downwardly by gravity, and the stern end of the boat is raised to allow the prop frame 13 to swing into position under it, as shown in dotted lines in Fig. 6. The boat is now ready for loading, and the first step in that direction is for the operator to take hold of the bow of the boat and raise it to a substantially vertical position, swinging the boat about the cross-member 15 at the outer end of the main frame 11 as an axis. There is sufficient clearance under the stern, by virtue of the outer end of the main frame being propped up on the prop frame 13, so that there is no danger of the boat getting scuffed, and the average man or woman, or an older boy or girl, will have no difficulty whatever in swinging the boat upwardly while it is so supported at the stern end, it being obvious that to a certain extent the weight of the boat is counterbalanced with respect to the pivotal axis 15, and, as the boat is raised farther and farther, more and more of the weight is assumed on this pivotal axis. In this pivotal movement of the boat relative to the main frame 11, the secondary frame 12 slides forwardly on the main frame at gradually increasing angularity until it reaches the limit position shown in Fig. 7, where the boat is forwardly inclined in the loading position, ready to be swung forwardly and upwardly from the stern end over the top of the car, in much the same way as one would move an overhead garage door to the overhead position. When the boat passes the upper dead-center in moving toward the loading position of Fig. 7, it will, of course, tend to fall toward the car, but soon after it passes the dead-center the blocks 36 encounter the springs 39 and they are compressed slightly as they assume the load, thereby avoiding shock and jar as well as noise. The boat in the loading position, shown in Fig. 7, can easily be raised from the stern end by the same single operator without any exertion, and after it has been raised a short distance, the weight of the boat and the attachment is balanced with respect to the hinging axis 18′, so that the further movement necessary to get the bow over the bar 46 is accomplished very easily and the boat does not drop heavily upon the bar, but engages it quite lightly, even if the operator is inexperienced in the handling of this equipment or does not exercise much care in the loading operation. Fig. 8 shows the boat at the point in the loading operation when the boat has just come to rest on the cross-bar 46 and has not yet been slid forward to the carrying position shown in Fig. 9. In this final forward movement, the secondary frame 12 again slides on the main frame 11 to a position of less angularity with respect thereto, and the weight of the stern end of the boat is, therefore, assumed entirely by the main frame 11. In other words, the secondary frame 12 cooperates with the main frame 11 in the support of the boat until the cross-bar 46 assumes support at the bow of the boat, and throughout this loading operation, the springs 39 are compressed to varying degrees, depending, obviously, upon the angularity of the boat 40. The springs 39, therefore, also play an important part throughout the actual loading operation in addition to absorbing the shock when the boat is swung past the vertical dead-center position into the loading position of Fig. 7. After the boat has been slid forward to the position of Fig. 9, the hooks 52 on the cross-bar 46 are attached to the gunwales and the hand nuts 53 are tightened to clamp the boat firmly onto the cross-bar, so that the boat is not apt to get loose or shift rearwardly from its set position. The prop frame 13 can be fastened in the folded position of Fig. 9 by means of the clips 45 before or after the boat has been clamped to the cross-bar 46 by means of the hooks 52. It should be evident from Fig. 9 that there is no obstruction to good visibility forwardly or rearwardly for the driver of the car when the boat is loaded on the car with my attachment, and, furthermore, there is nothing to obstruct access to the rear trunk compartment. In unloading the boat, the procedure described is, of course, repeated in the reverse order. Obviously in unloading, the operator should be careful to release the secondary frame 13 from the clips 45, so as to be sure that this frame will be in readiness to rest on the ground when the boat is moved from the position of Fig. 8 to that of Fig. 7, otherwise the stern end of the boat would, of course, come into contact with the ground. The frame 13 gravitates automatically to the operative position when released. The springs 39 again absorb shock and jar in this portion of the unloading operation, and, inasmuch as the boat, when disposed in the position of Fig. 7, is so close to a dead-center position, the operator has no difficulty in swinging it toward and past dead-center toward the position of Fig. 6, and thereafter the final steps in the disconnection of the boat from the attachment 10 are believed to be obvious.

It is believed the foregoing description conveys a good understanding of the objects and advantages of my invention. The appended claims have been drawn to cover all legitimate modifications and adaptations.

I claim:

1. A boat loading device of the class described comprising an elongated main frame having means on one end adapted for pivotally connecting the same to the lower portion of a vehicle onto the top of which a boat is to be loaded for carrying, means pivoted on the other end of said frame adapted to be detachably secured to one end portion of the boat to be loaded, a shorter secondary frame slidably pivotally connected at one end to the main frame intermediate the ends thereof for movement lengthwise relative thereto and having means pivoted on the other end adapted to be detachably secured to the same aforesaid end portion of the boat to be loaded, and means for supporting the main frame in elevated relation to the ground when swung to a substantially horizontal position preliminary to loading of the boat atop said vehicle so that the boat after being attached to said frame may be swung relative to the main frame to an upright position preparatory to loading on top of said vehicle, said secondary frame serving to support said boat in a predetermined substantially rigid angular relation to the main frame in the upright position and during subsequent upward swinging movement of the main frame in the loading of the boat onto the top of said vehicle.

2. A boat loading device as set forth in claim 1 including spring means yieldably limiting sliding movement of the pivotally connected end of said secondary frame relative to the main frame.

3. A boat loading device of the class described comprising an elongated main frame for elevating and thereafter supporting one end of the boat while the other end is otherwise supported, said main frame having means on one end adapted for pivotally connecting the same to the lower portion of a vehicle onto the top of which the boat is to be loaded for carrying, means pivoted on the other end of said frame adapted to be detachably secured to one end portion of the boat to be loaded, and a shorter secondary frame slidably pivotally connected at one end to the main frame intermediate the ends thereof for a predetermined limited movement lengthwise relative thereto for rigid support of the boat in a predetermined angular relationship to the main frame in an intermediate position of the boat preparatory to elevation of the boat onto the top of the vehicle, said secondary frame having means pivoted on the other end adapted to be detachably secured to the same aforesaid end portion of the boat to be loaded.

4. A boat loading device as set forth in claim 3 including spring means yieldably limiting sliding movement of the pivotally connected end of said secondary frame in one direction relative to the main frame.

5. A boat loading device of the class described comprising an elongated main frame having means on one end adapted for pivotally connecting the same to the lower portion of a vehicle onto the top of which a boat is to be loaded for carrying, means pivoted on the other end of said frame adapted to be detachably secured to one end portion of the boat to be loaded, and a shorter secondary frame slidably pivotally connected at one end to the main frame intermediate the ends thereof for movement lengthwise relative thereto and having means pivoted on the other end adapted to be detachably secured to the same aforesaid end portion of the boat to be loaded, said means on said main and secondary frames adapted for detachably securing to the boat being designed for attachment to the gunwales and said main and secondary frames being both adjustable as to width to permit application to boats of different widths between the gunwales.

6. A device for loading a boat on top of a vehicle having an end bumper, comprising a U-shaped frame having means on the ends of the arms of the U adapted to be hingedly secured to the bumper in laterally spaced relation to each other, means on the cross-portion of the U adapted to be detachably secured to the gunwales of a boat for pivotally connecting the boat thereto, a radius member slidably pivotally connected at one end to an arm of the U intermediate the ends of the latter for a predetermined limited movement lengthwise relative thereto for rigid support of the boat in a predetermined angular relationship to the U-shaped frame in an intermediate position of the boat preparatory to elevation thereof onto the top of the vehicle, said radius member carrying means on the other end for detachably pivotally connecting the boat thereto, and means whereby said U-shaped frame may be rigidly supported in a substantially horizontal position extending away from the bumper.

7. A device for loading a boat on top of a vehicle having an end bumper, comprising a U-shaped frame having means on the ends of the arms of the U adapted to be hingedly secured to the bumper in laterally spaced relation to each other, means on the cross-portion of the U adapted to be detachably secured to the gunwales of a boat for pivotally connecting the boat thereto, a radius member slidably pivotally connected at one end to an arm of the U intermediate the ends of the latter for a predetermined limited movement lengthwise relative thereto for rigid support of the boat in a predetermined angular relationship to the U-shaped frame in an intermediate position of the boat preparatory to elevation thereof onto the top of the vehicle, said radius member carrying means on the other end for detachably pivotally connecting the boat thereto, and means cushioning the movement of said radius member relative to said frame at one end of its travel.

8. A device for loading a boat on top of a vehicle having an end bumper, comprising a U-shaped frame having means on the ends of the arms of the U adapted to be hingedly secured to the bumper in laterally spaced relation to each other, means on the cross-portion of the U adapted to be detachably secured to the gunwales of a boat for pivotally connecting the boat thereto, and radius arms having offset end portions slidably pivotally connected to the arms of the U intermediate their ends for a predetermined limited movement lengthwise relative thereto for rigid support of the boat in a predetermined angular relationship to the U-shaped frame in an intermediate position of the boat preparatory to elevation thereof onto the top of the vehicle, the offsetting of said ends permitting the arms to reach over the cross-portion of the U for connection to the boat, and means on the other ends of the radius arms adapted to be detachably secured to the gunwales of the boat for pivotally connecting the boat thereto.

9. A device for loading a boat on top of a vehicle having an end bumper, comprising a U-shaped frame having means on the ends of the arms of the U adapted to be hingedly secured to the bumper in laterally spaced relation to each other, means on the cross-portion of the U adapted to be detachably secured to the gunwales of a boat for pivotally connecting the boat thereto, radius arms having offset end portions slidably pivotally connected to the arms of the U intermediate their ends, the offsetting of said ends permitting the arms to reach over the cross-portion of the U for connection to the boat, means on the other ends of the radius arms adapted to be detachably secured to the gunwales of the boat for pivotally connecting the boat thereto, there being slide elements pivotally connected to the offset ends of said radius arms slidable in the arms of said U, and coiled compression springs in the arms of said U for yieldably resisting further movement of said slides when they have moved a predetermined distance toward the bumper attached ends of said arms.

10. A device for loading a boat on top of a vehicle, comprising an elongated loading frame adapted to be hingedly supported at one end on the lower portion of the vehicle, means pivotally connected to the other end of said loading frame for attachment to one end portion of a boat when the boat is horizontally disposed in end to end relation with said frame, whereby the boat when so connected to said frame may be swung first to an upright position relative to said frame and then onto the top of said vehicle using said frame as an elevator, the boat being finally supported at one end on the vehicle top and at the other end on said loading frame, and brace means extending between the mid-portion of said loading frame and a point on said boat spaced a substantial distance from said pivotally connected means for supporting said boat rigidly in the upright loading position at a predetermined angle relative to said loading frame for the boat elevating operation, said brace means being automatically adjustable in relation to the boat and loading frame so as to allow the boat to assume positions at greater angles relative to said frame when the boat after elevation thereof is supported partly on the vehicle top.

11. A device as set forth in claim 10, including means for supporting said loading frame temporarily in a substantially horizontal position supporting the attached end portion of the boat in elevated relation to the ground preliminary to the boat elevating operation.

LA VERNE O. ELLINGSON.

References Cited in the file of this patent

UNITED STATES PATENTS

| Number | Name | Date |
| --- | --- | --- |
| 2,130,117 | Butts | Sept. 13, 1938 |
| 2,180,032 | Casley | Nov. 14, 1939 |
| 2,294,864 | Palmer | Sept. 1, 1942 |
| 2,392,008 | Squires | Jan. 1, 1946 |
| 2,395,173 | Dobler | Feb. 19, 1946 |
| 2,436,718 | Franke | Feb. 24, 1948 |
| 2,446,092 | Lait | July 27, 1948 |
| 2,464,979 | Hyatt | Mar. 22, 1949 |
| 2,479,035 | Burkey | Aug. 16, 1949 |
| 2,486,316 | Morse et al. | Oct. 25, 1949 |
| 2,584,163 | Squires | Feb. 5, 1952 |